United States Patent
Nonomura et al.

(10) Patent No.: US 12,321,528 B2
(45) Date of Patent: Jun. 3, 2025

(54) HEAD-MOUNTED DISPLAY

(71) Applicant: Maxell, Ltd., Kyoto (JP)

(72) Inventors: Yo Nonomura, Tokyo (JP); Naoyuki Kanda, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 18/442,182

(22) Filed: Feb. 15, 2024

(65) Prior Publication Data

US 2024/0201791 A1 Jun. 20, 2024

Related U.S. Application Data

(63) Continuation of application No. 17/892,320, filed on Aug. 22, 2022, now abandoned, which is a continuation of application No. 16/625,824, filed as application No. PCT/JP2017/030273 on Aug. 24, 2017, now Pat. No. 11,455,042.

(51) Int. Cl.
  *G06F 3/01* (2006.01)
  *G02B 27/01* (2006.01)
  *G06T 3/20* (2006.01)
  *G06T 3/40* (2006.01)
  (Continued)

(52) U.S. Cl.
  CPC ............ *G06F 3/017* (2013.01); *G02B 27/017* (2013.01); *G02B 27/0172* (2013.01); *G06F 3/012* (2013.01); *G06T 3/20* (2013.01); *G06T 3/40* (2013.01); *G06T 7/50* (2017.01); *G06T 7/70* (2017.01); *G02B 2027/014* (2013.01); *G02B 2027/0178* (2013.01); *G06T 2200/24* (2013.01);
  (Continued)

(58) Field of Classification Search
  CPC .............................. G06F 3/017; G02B 27/017
  See application file for complete search history.

(56) References Cited

U.S. PATENT DOCUMENTS

9,933,853 B2   4/2018  Lundberg et al.
2014/0368537 A1  12/2014  Salter et al.
(Continued)

FOREIGN PATENT DOCUMENTS

JP   2012-108577 A   6/2012
JP   2016-525741 A   8/2016
(Continued)

OTHER PUBLICATIONS

International Search Report of PCT/JP2017/030273 dated Oct. 3, 2017.

*Primary Examiner* — Matthew Salvucci
(74) *Attorney, Agent, or Firm* — Mattingly & Malur, PC

(57) ABSTRACT

A head-mounted display (HMD) 1, which is operated by a gesture operation performed by a user 3, is provided with a distance image acquisition unit 106 that detects a gesture operation, a position information acquisition unit 103 that acquires position information of the HMD 1, and a communication unit 2 that performs communication with another HMD 1'. A control unit 205 sets and displays an operating space 600 where a gesture operation performed by the user 3 is valid, exchanges position information and operating space information of the host HMD 1 and the other HMD 1 therebetween by the communication unit 2, and adjusts the operating space of the host HMD so that the operating space 600 and an operating space 600' of the other HMD 1 do not overlap each other.

8 Claims, 16 Drawing Sheets

(51) Int. Cl.
G06T 7/50 (2017.01)
G06T 7/70 (2017.01)

(52) U.S. Cl.
CPC ............... *G06T 2207/10028* (2013.01); *G06T 2207/30196* (2013.01); *G06T 2219/2021* (2013.01)

(56) References Cited

U.S. PATENT DOCUMENTS

2016/0337612 A1* 11/2016 Im .................... H04N 23/635
2017/0153713 A1    6/2017 Niinuma et al.

FOREIGN PATENT DOCUMENTS

| JP | 2017-037212 A | 2/2017 |
| JP | 2017-102603 A | 6/2017 |

\* cited by examiner

F I G. 9
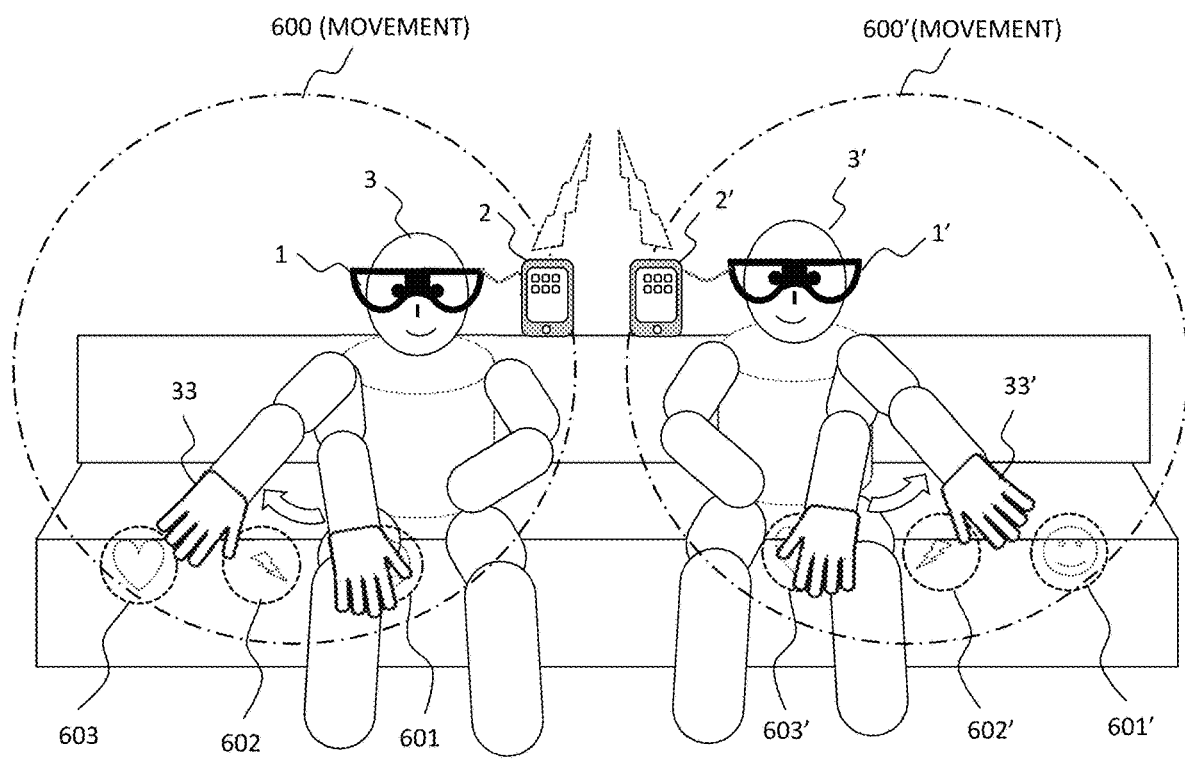

HEAD-MOUNTED DISPLAY

TECHNICAL FIELD

The present invention relates to a head-mounted display that displays a mixed reality image and can be operated by a gesture operation by a user.

BACKGROUND ART

Recently, a head-mounted display (hereinafter, referred to as "HMD") which has a shape of eye-glasses or goggles and in which mixed reality objects are superimposed on a real space by projecting mixed reality images to a portion corresponding to a highly transparent lens, and the mixed reality objects can be recognized as actually existing objects has been developed. Patent Document 1 discloses a system that displays a shared virtual object and a private virtual object in a mixed reality environment.

In addition, a gesture user interface (gesture UI) that is operated by movement of a user's hand to perform an operation such as content viewing initiation and content selection by the HMD is known. The HMD can be operated with the gesture UI without carrying an operation device in a hand, and thus convenience is high. However, since the gesture UI is accompanied with movement of a body, in a situation in which a user who operates an additional HMD is located nearby, there is a concern that bodies of users may collide with each other due to gesture operations. To avoid the collision, Patent Document 2 discloses the following configuration. Specifically, the HMD is provided with a device information notification unit (marker) configured to specify a position of a host device, a distance or a direction of the marker is detected by photographing the marker with a camera, and an operating space of the HMD is adjusted so that gesture spaces of a plurality of the HMDs do not overlap each other.

CITATION LIST

Patent Document

Patent Document 1: JP 2016-525741 W
Patent Document 2: JP 2012-108577 A

SUMMARY OF THE INVENTION

Problems to be Solved by the Invention

In Patent Document 1, avoidance of collision with another person due to a gesture operation is not considered. In addition, in Patent Document 2, avoidance of collision with a person who does not use an HMD is not considered. Even in the case of employing a method described in Patent Document 2, when an HMD of another user faces an opposite direction or a shielding object exists in the middle, a marker provided in the HMD may not be detected with a camera. In this case, it is difficult to understand a distance or a direction of the HMD of the other user, and collision may occur. In addition, adjustment of the gesture space is performed only with the host device. Accordingly, when mutual operating spaces are set to be spaced apart from each other, the operating spaces for the users may be adjusted to be excessively narrow, and thus convenience becomes poor.

An object of the invention is to provide an HMD including an operating space that is capable of avoiding collision of bodies due to a gesture operation not only between users who use an HMD but also between a user who uses the HMD and a user who does not use the HMD, and is easy for a user to use.

Solutions to Problems

According to an aspect of the invention, there is provided a head-mounted display including: an image projection unit that projects an image; a see-through lens that superimposes the image projected from the image projection unit on a nearby space and displays the image as a mixed reality object; a distance image acquisition unit that acquires a distance image and detects a gesture operation by a user; a position information acquisition unit that acquires position information of the head-mounted display (host HMD); a communication unit that performs communication with an external terminal; and a control unit that controls an image projection operation by the image projection unit on the basis of the gesture operation by the user which is detected by the distance image acquisition unit. The control unit sets an operating space where the gesture operation performed by the user is valid and displays the operating space as a mixed reality object, performs communication with another head-mounted display (another HMD) by the communication unit to exchange position information and operating space information of the host HMD and the other HMD, and adjusts the operating space of the host HMD so that the operating space of the host HMD and an operating space of the other HMD do not overlap each other.

In addition, according to another aspect of the invention, there is provided a head-mounted display including: an image projection unit that projects an image; a see-through lens that superimposes the image projected from the image projection unit on a nearby space and displays the image as a mixed reality object; a distance image acquisition unit that acquires a distance image and detects a gesture operation by a user, a nearby person, or an object; and a control unit that controls an image projection operation by the image projection unit on the basis of the gesture operation by the user which is detected by the distance image acquisition unit. The control unit sets an operating space where the gesture operation performed by the user is valid and displays the operating space as a mixed reality object, and in a case where the person or the object which is detected by the distance image acquisition unit exists in the operating space, the control unit adjusts the operating space so that a position at which a detected person or object exists and the operating space do not overlap each other.

Effects of the Invention

According to the invention, it is possible to provide an HMD including an operating space that is capable of avoiding collision of bodies due to a gesture operation not only between users who use an HMD but also between a user who uses the HMD and a user who does not use the HMD, and is easy for a user to use.

BRIEF DESCRIPTION OF THE DRAWINGS

FIG. 9 is a view illustrating a case where gesture spaces are moved to avoid collision.

MODE FOR CARRYING OUT THE INVENTION

Hereinafter, an embodiment of the invention will be described with reference to the accompanying drawings.

Example 1

In Example 1, description will be given of a configuration in which collision of user's bodies due to a gesture operation is avoided in a case where a plurality of HMD users are close to each other.

Figure 1:
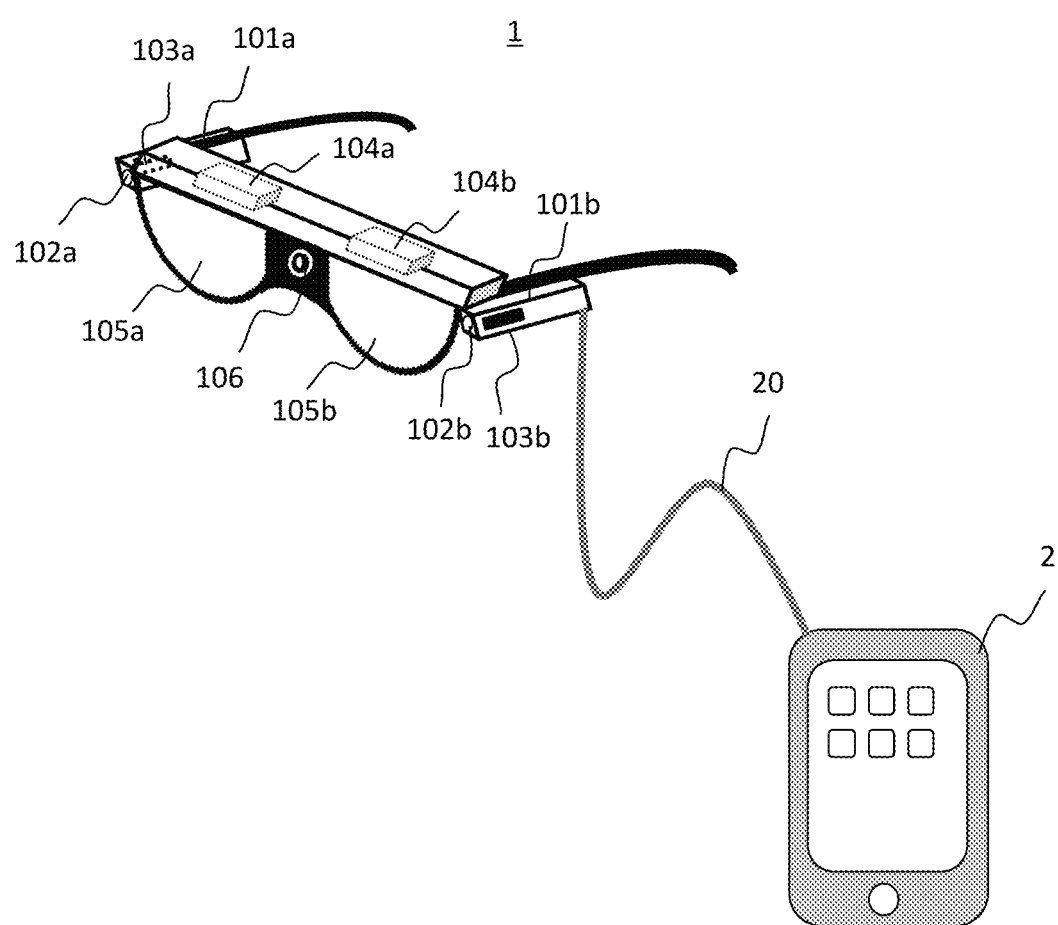
FIG. 1 is a view illustrating an external configuration of an HMD (Example 1).

FIG. 1 is a view illustrating an external configuration of a head-mounted display (HMD) according to this example. An HMD 1 includes system storage units 101a and 101b which store a control unit, a memory, a storage, or the like, cameras 102a and 102b, position information radio wave reception units (position information acquisition units) 103a and 103b, image projection units 104a and 104b which project an image of a mixed reality object, see-through lenses 105a and 105b which reflect a projected mixed reality object in a state of being superimposed on a nearby space, and a distance image acquisition unit 106 that acquires a distance image.

Here, a bi-ocular HMD in which right and left images are displayed on right and left see-through lenses 105a and 105b by two image projection units 104a and 104b is illustrated, but a monocular HMD that displays one image is also possible.

The position information radio wave reception units 103a and 103b receive a radio wave signal from a beacon to be described later, and acquire a position of the HMD 1. The distance image acquisition unit 106 detects an operation (gesture operation) of a user's hand. In addition, the distance image acquisition unit 106 detects a person or an object that exists in front of the HMD 1, and measures a distance or a direction of the person or the object. As a specific example of the distance image acquisition unit 106, a time of flight (TOF) camera that measures a distance from a flight time of light can be used.

In addition, the HMD 1 is connected to a smartphone 2 having an inter-terminal communication function defined by a specification of 5th generation mobile communication through a communication cable 20. Note that, radio communication such as WiFi and Bluetooth may be used instead of the communication cable 20. In addition, in a case where the system storage units 101a and 101b have the communication function defined by the specification of the 5th generation mobile communication, communication with the smartphone 2 on an outer side is not necessary.

Figure 2:
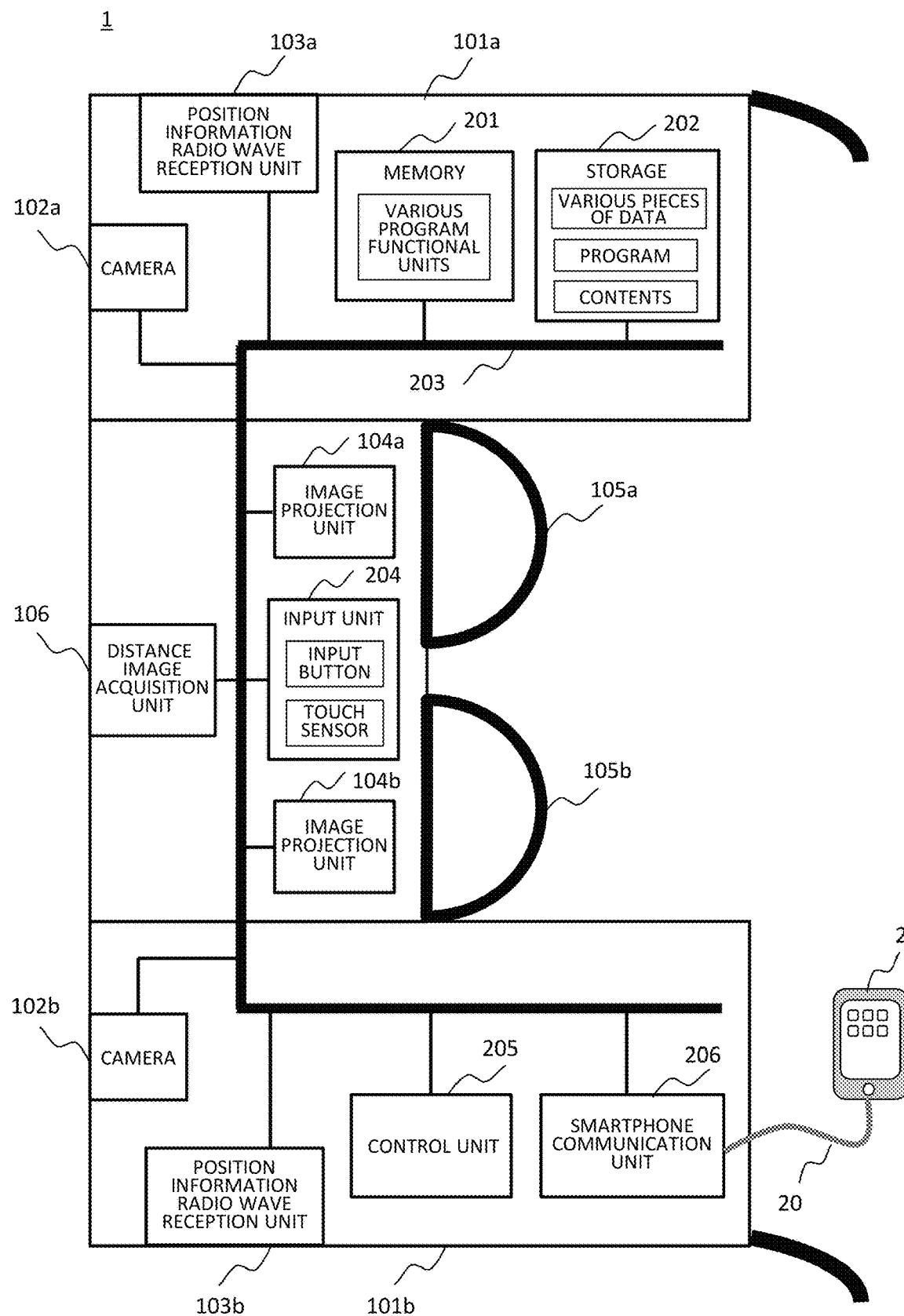
FIG. 2 is a diagram illustrating a system configuration of the HMD.

FIG. 2 is a diagram illustrating a system configuration of the HMD illustrated in FIG. 1. The system storage units 101a and 101b of the HMD 1 include a memory 201 that stores various program functional units in execution, a storage 202 that stores various pieces of data, a program, contents, or the like, a control unit 205 that performs execution of the program, and a smartphone communication unit 206 that performs communication with the smartphone 2, and the constituents elements are connected by a bus 203. In addition, as an input unit 204, an input button, a touch sensor for a fingertip to an HMD frame, or an input unit by vibration of the HMD frame or the like is provided.

The control unit 205 receives a user's operation through the distance image acquisition unit 106, the input unit 204, or the smartphone 2, and controls a display operation of an image (content image) by the image projection units 104a and 104b. In addition, the control unit 205 detects that another person (another HMD) exists nearby by the distance image acquisition unit 106 or the smartphone 2, and adjusts an operating space for a gesture operation to avoid collision of user's bodies.

Figure 3:
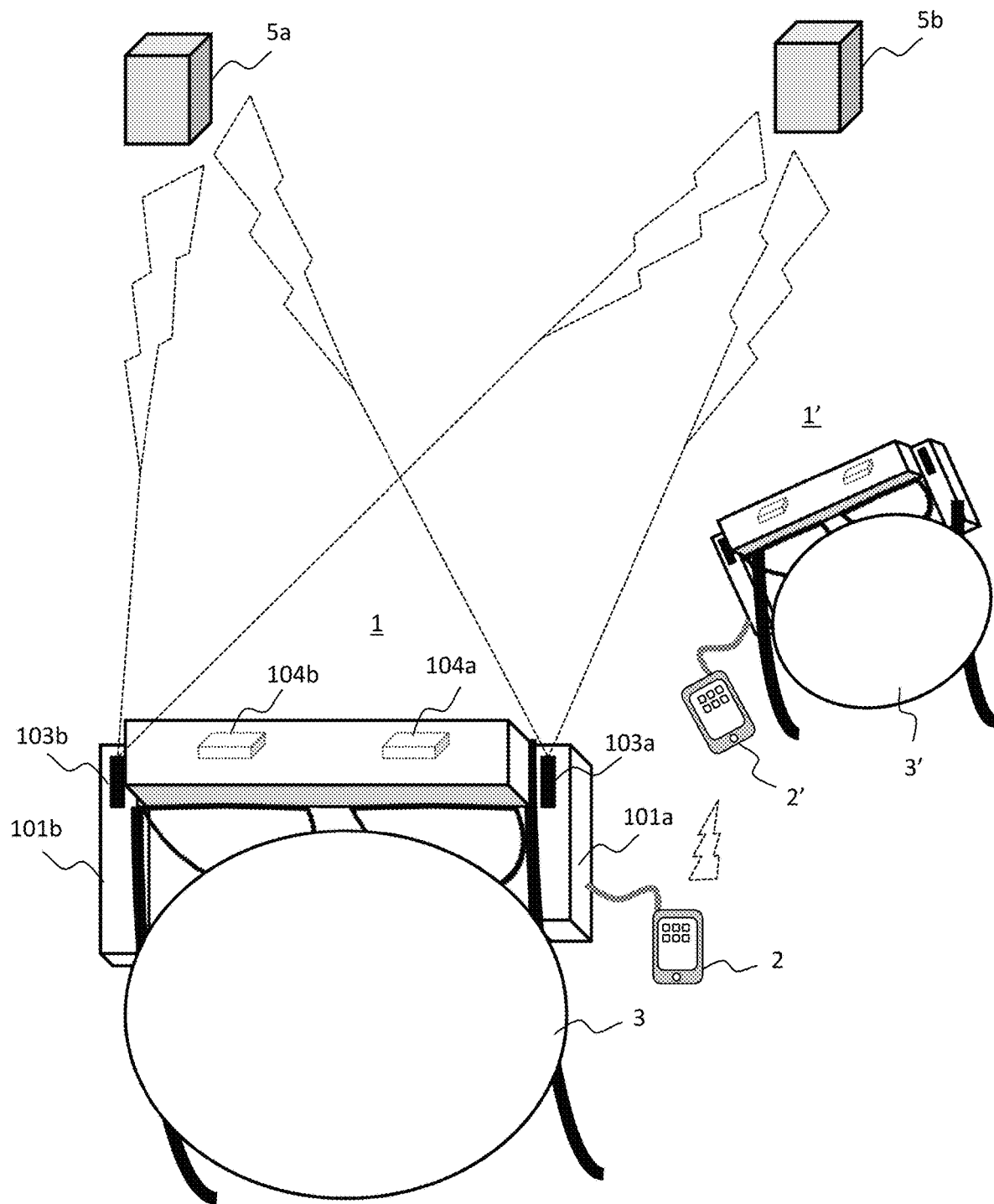
FIG. 3 is a view describing a position information acquisition function of the HMD.

FIG. 3 is a view describing a position information acquisition function of the HMD. The HMD 1 can acquire position information of the HMD 1 by beacons 5a and 5b for position information acquisition which are provided indoors. For example, as in iBeacon (registered trademark), the beacons 5a and 5b for position information acquisition transmit an identification number of each of the beacons by using a radio technology such as Bluetooth (registered trademark) Low Energy. Note that, a beacon device using Bluetooth (registered trademark) is disclosed in JP 2010-130661 A or the like.

The position information radio wave reception units (position information acquisition units) 103a and 103b of the HMD 1 receive radio waves from the beacons 5a and 5b and measure intensity of the radio waves to understand a distance from the two beacons 5a and 5b. At this time, the HMD 1 receives radio waves by the two position information radio wave reception units 103a and 103b, and can understand that the HMD 1 is inclined to which direction when viewed from the beacons 5a and 5b from differential intensity. That is, it is possible to acquire position information of the HMD 1 based on the two beacons 5a and 5b, and information of a direction of a user 3 who uses the HMD 1.

In addition, in a case where another user 3' uses another HMD 1' in the same room, it is possible to acquire position information of the other HMD 1' based on the beacons 5a and 5b, and information of a direction of the user 3' who uses the HMD 1'. The user 3 and the user 3' can exchange a plurality of pieces of the position information of the HMDs and a plurality of pieces of the information of the direction which are respectively acquired by using short-range inter-terminal communication (smartphones 2 and 2') of the 5th generation mobile communication.

Figure 4:
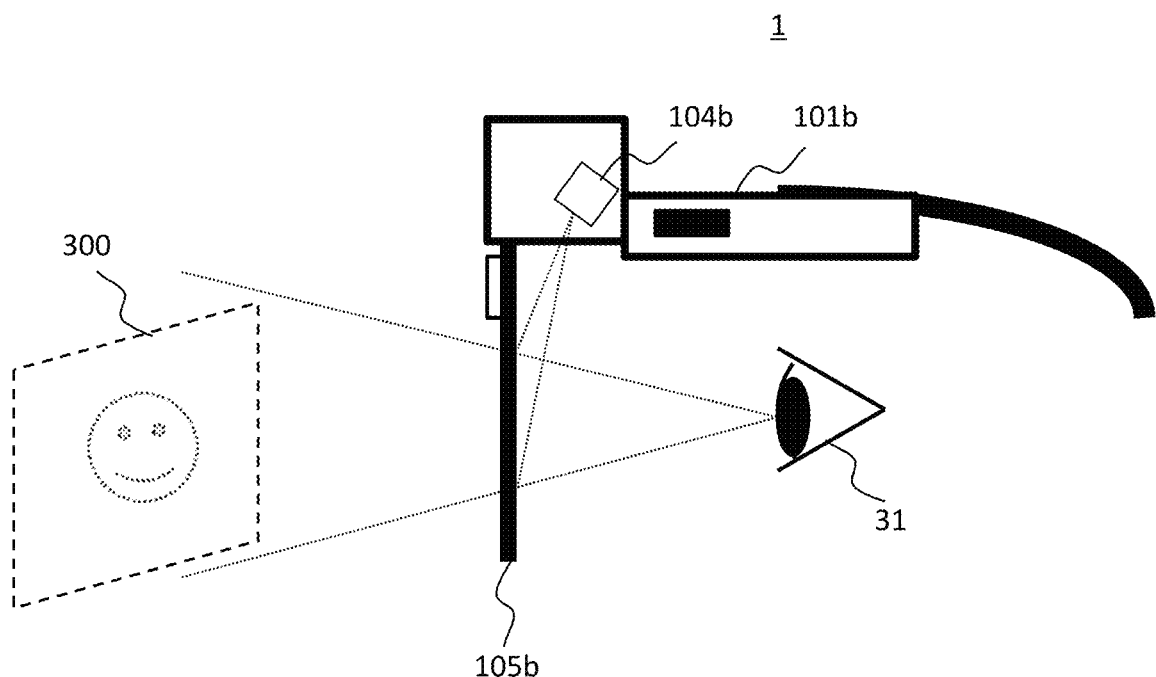
FIG. 4 is a view illustrating a state in which a mixed reality object is displayed by the HMD.

FIG. 4 is a view illustrating a state in which a mixed reality object is displayed by the HMD and the HMD 1 is viewed from a left side. A mixed reality object 300 that is projected from the image projection unit 104b is displayed on the see-through lens 105b. When the mixed reality object 300 is viewed from an eye 31 of an HMD user, it appears as if the mixed reality object 300 is floating in a space in front of the HMD user in an actual nearby background. The mixed reality object 300 may be various contents such as image contents, an object for a gesture operation, and an operating space object. Hereinafter, the objects are simply referred to as "object".

Figure 5:
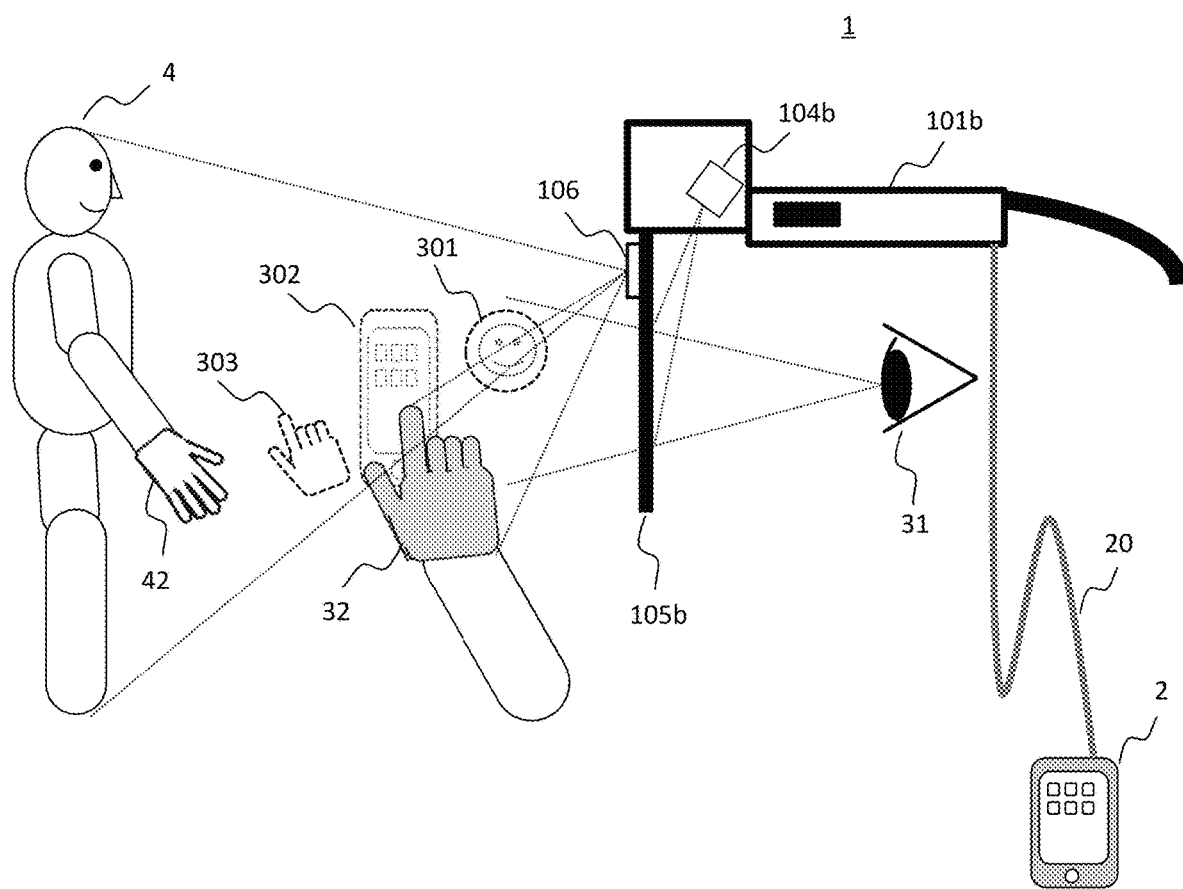
FIG. 5 is a view describing various use methods by a user with respect to the HMD.

FIG. 5 is a view describing various use methods by a user with respect to the HMD.

(1) A spherical object 301 is displayed in front of the eye 31 of the HMD user. The user performs a gesture of moving a hand 32 to touch the object 301 or to put the object 301 sideway. The distance image acquisition unit 106 detects that the hand 32 of the user has performed the gesture with respect to the object 301 at a position of the object 301. According to this, the user can perform an operation such as selection, viewing initiation, and viewing stoppage of viewing contents to be displayed by the HMD 1.

(2) An object 302 having a shape of a smartphone is displayed in front of the eye 31 of the HMD user. The user performs a gesture of moving the hand 32 with respect to the object 302 as if the user operates an actual smartphone. The distance image acquisition unit 106 detects that the hand 32 of the user has performed the gesture of operating the smartphone at a position of the object 302. According to this, as in the operation with respect to an actual smartphone, the user can perform an operation such as activation or stoppage of an application, installation of the application, and initiation or termination of communication.

(3) The case of actually operating a touch panel of the smartphone 2 connected to the HMD 1 as an operation other than the gesture. An object 303 having a shape of a hand is displayed in front of the eye 31 of the HMD user in combination with the object 302 having a shape of a smartphone. At this time, since the object 303 is displayed in a motion linked to an actual operation on the smartphone 2 by the user, the user can perform the operation on the HMD without directing a visual line to the smartphone 2.

In addition, the HMD can also be operated with an input button or a touch sensor through the input unit 204 in FIG. 2. In addition, when another person 4 who does not use the HMD approaches the vicinity of the HMD user, the distance image acquisition unit 106 acquires information including a silhouette of a shape of the other person 4 and a distance to the other person 4. According to this, it is possible to recognize that the other person has approached the vicinity, and to recognize that, for example, a right hand 42 of the approaching person is held out to the HMD user.

Next, description will be given of the basis of a method of viewing the mixed reality contents by the HMD.

Figure 6:
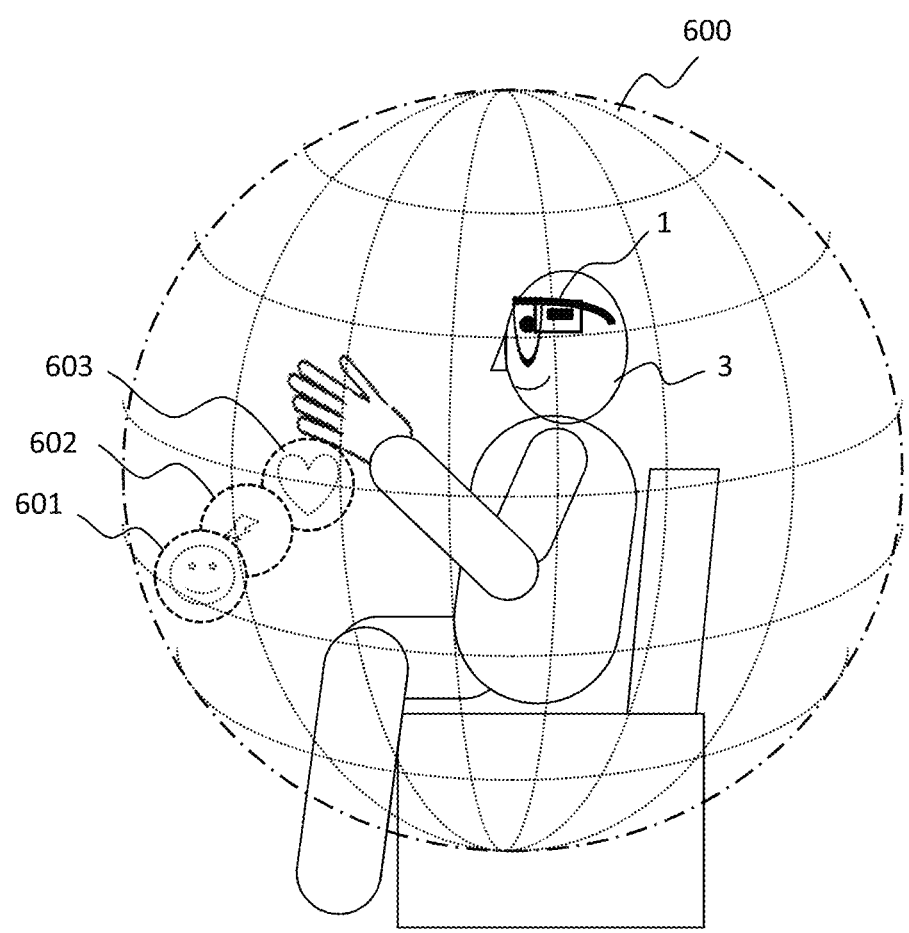
FIG. 6 is a view illustrating an example of an operation object that is displayed with respect to an HMD user.

FIG. 6 is a view illustrating an example of an operation object that is displayed with respect to the HMD user. An object (operating space object) 600 indicating a spherical gesture space is displayed at the periphery of a user 3 who is sitting in a state of wearing the HMD 1. The operating space object 600 indicates a range of a space where a gesture operation performed by the user 3 is valid, and it should be understood that when exceeding the range, the operation is invalid, and collision with a body of another person may occur. Objects (operation objects) 601, 602, and 603 for performing a gesture operation of selection, viewing initiation, or viewing termination of mixed reality contents (hereinafter, simply referred to as "contents") desired to view are displayed at the inside of the operating space.

Figure 7:
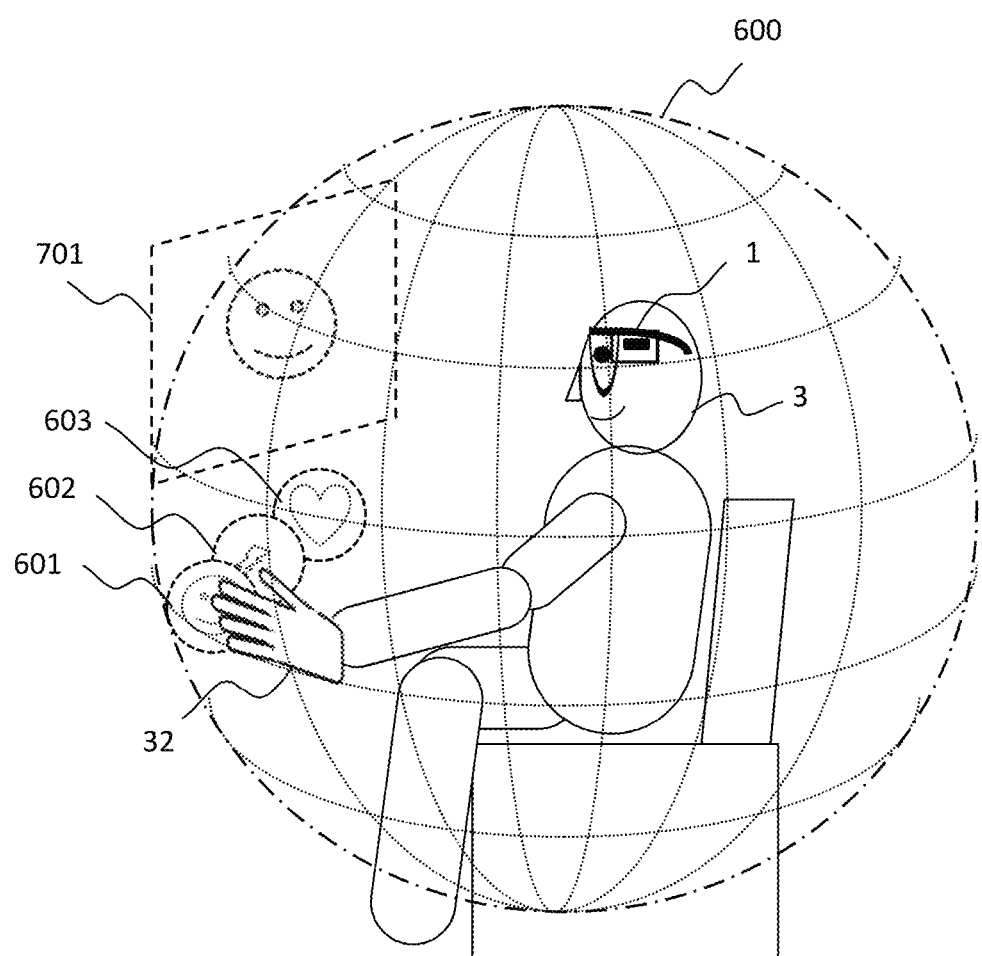
FIG. 7 is a view illustrating a state in which a user performs a gesture operation to view contents.

FIG. 7 is a view illustrating a state in which the user performs the gesture operation and views a content. For example, a desired content is selected by performing a gesture in which the hand 32 of the user 3 touches the operation object 601. In this state, a corresponding mixed reality content 701 is displayed in front of the user 3, and the user 3 can initiate viewing.

Next, description will be given of a configuration for avoiding collision of bodies of users due to a gesture operation in a case where a plurality of HMD users are close to each other.

Figure 8:
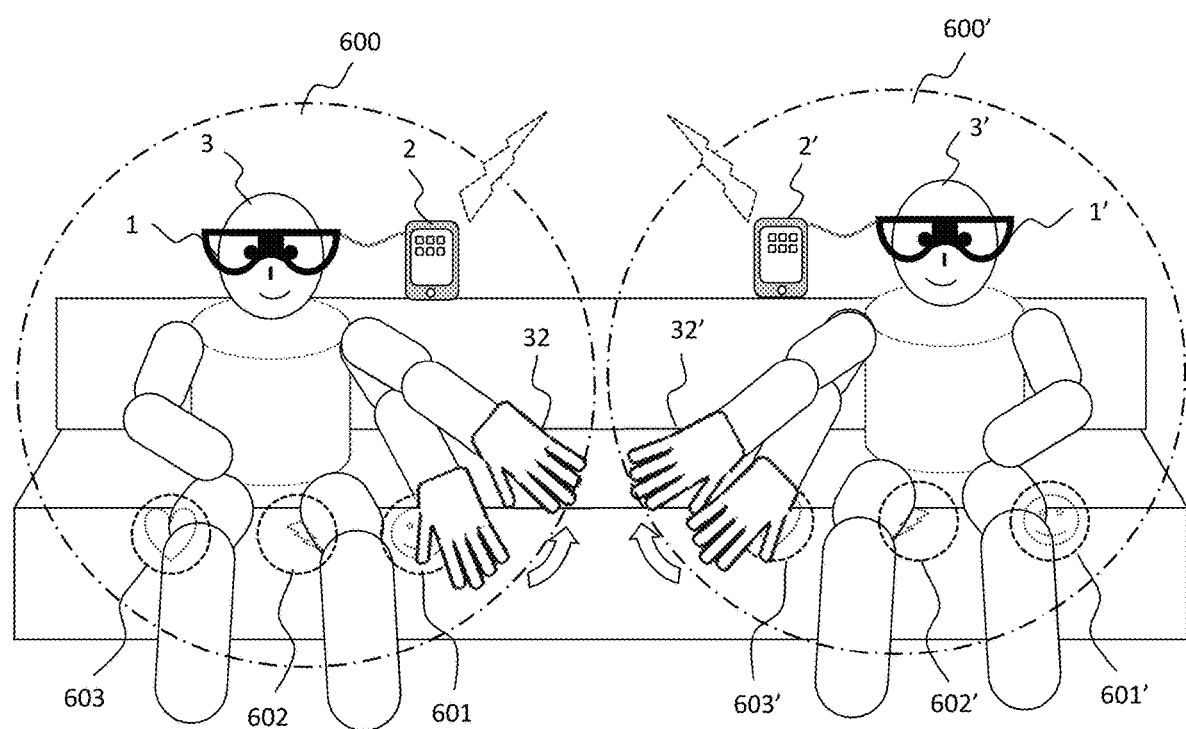
FIG. 8 is a view illustrating a state in which two HMD users respectively use HMDs side by side.

FIG. 8 is a view illustrating a state in which two HMD users respectively use HMDs side by side. Operating space objects 600 and 600' indicating respective gesture spaces are displayed at the periphery of HMD users 3 and 3'. Note that, the operating space objects 600 and 600' are indicated by an outermost peripheral circle (one-dot chain line) to avoid complication of the drawing. In this case, HMDs 1 and 1' may display only an own gesture space with respect to each user, but may display a gesture space of another user in combination. This can be realized by exchanging information of a position or a size of the gesture spaces between the HMDs by using an inter-terminal communication function (smartphones 2 and 2') of the $5^{th}$ generation mobile communication. According to this, the user 3 can view not only the own object 600 but also the object 600' for the user 3'.

Operation objects 601 to 603 and 601' to 603' for performing a gesture operation of selection, viewing initiation, or viewing termination of contents are displayed in an operating space. Note that, display of a content that is being viewed is omitted to avoid complication of the drawing.

For example, the user 3 or 3' may perform an operation of putting a corresponding object (here, 601 or 603') sideway with a hand 32 or 32' to stop viewing of a content that is being viewed. In a case where a distance between two persons is short, there is a concern that the hands 32 and 32' may collide with each other.

FIG. 9 is a view illustrating a case where gesture spaces are moved to avoid collision. The gesture spaces (objects 600 and 600') with respect to two HMD users 3 and 3' are moved in directions to be spaced apart from each other to avoid overlapping of the operating spaces. In addition, display positions of the objects (601 to 603 and 601' to 603') for the gesture operation are moved, and the gesture operation is prompted to be performed by using a hand 33 or 33' on a side distant from the users different from each other. According to this, it is possible to avoid collision of hands of the users 3 and 3' close to each other.

Figure 10:
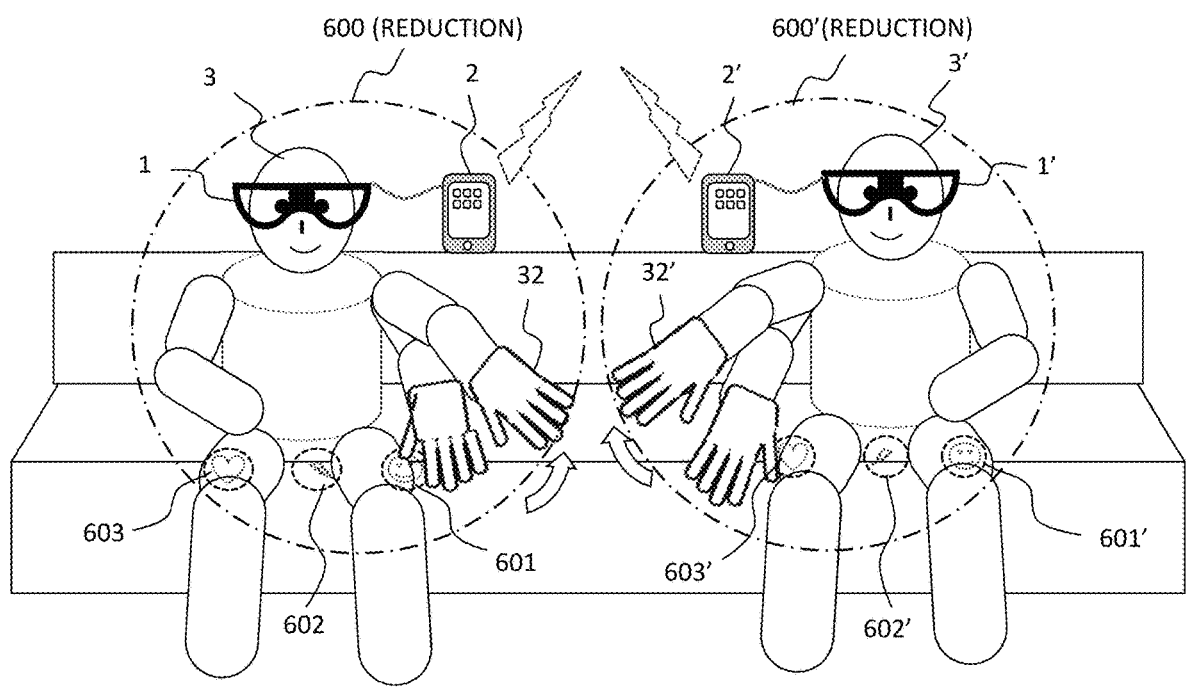
FIG. 10 is a view illustrating a case where the gesture spaces are reduced to avoid collision.

FIG. 10 is a view illustrating the case of reducing the gesture spaces to avoid collision. Sizes of the gesture spaces (objects 600 and 600') with respect to the two HMD users 3 and 3' are reduced to avoid overlapping of the gesture spaces. In addition, sizes of the gesture operation objects (601 to 603 and 601' to 603') are reduced to enter the reduced gesture spaces, and display positions are set to be close to each other. Note that, when reducing the size of each of the gesture spaces, the gesture space may be reduced in a state of being a spherical space, or the operating space may be limited to the lower half of a spherical space or a shape of the operating space may be modified to a spheroid. According to this, it is possible to avoid collision of hands of the users 3 and 3' close to each other.

In the case of performing movement or reduction of the operating spaces as in FIG. 9 or FIG. 10 described above, operating space information is exchanged between the HMDs 1 and communication 1' through the inter-terminal function (smartphones 2 and 2'), a determination is made as to whether or not the operating spaces overlap each other, and new operating spaces are determined to avoid overlapping. That is, the HMD 1 and the HMD 1' can detect that the HMD 1 and the HMD 1' are located nearby by the inter-terminal communication function. Accordingly, even in a case where a counterpart HMD faces any direction, or a shielding object exists in the middle, overlooking does not occur. In addition, both the HMDs 1 and 1' determine the operating spaces in conjunction with each other, and thus the operating spaces after adjustment can be set to an optimal size without being excessively narrow.

Figure 11:
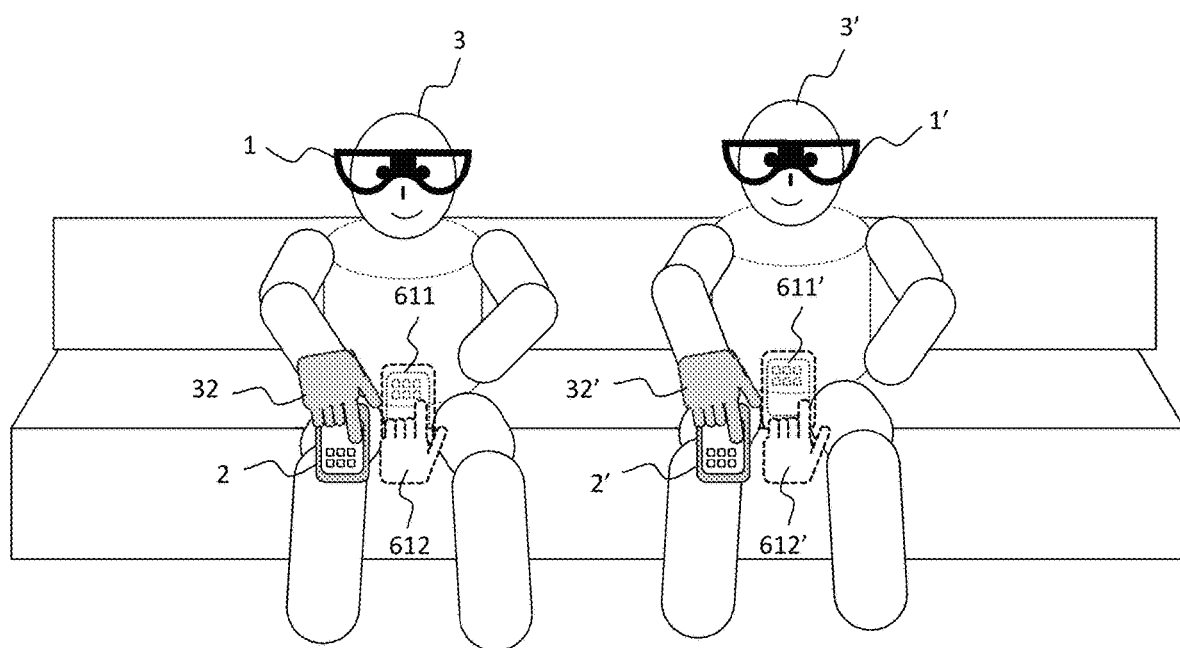
FIG. 11 is a view illustrating a case where a gesture operation is switched to an operation of a smartphone.

FIG. 11 is a view illustrating a case where the gesture operation is switched to an operation by a smartphone. Even when performing adjustment of the gesture spaces, in a case where it is difficult to avoid collision of hands of the users 3 and 3', the HMDs 1 and 1' terminate display of the operating space objects 600 and 600' with respect to the users 3 and 3', and give a notification indicating that an operation by a gesture is not accepted. In addition, the users 3 and 3' perform switching to an operation by real smartphones 2 and 2'. In this case, smartphone-shaped objects 611 and 611' and hand-shaped objects 612 and 612' for operating the smartphones by mixed reality are displayed in front of the users 3 and 3'. In addition, when operating real smartphones 2 and 2' with hands 32 and 32', display positions of the hand-shaped objects 612 and 612' are moved in conjunction with movement of the operating hands 32 and 32'. According to this, the users 3 and 3' can operate the smartphones without directing a visual line to the real smartphones 2 and 2'. According to this, for example, it is possible to perform an operation of selection, viewing initiation, or viewing termination of contents by operating smartphones 2 and 2' in a pocket.

Figure 12:
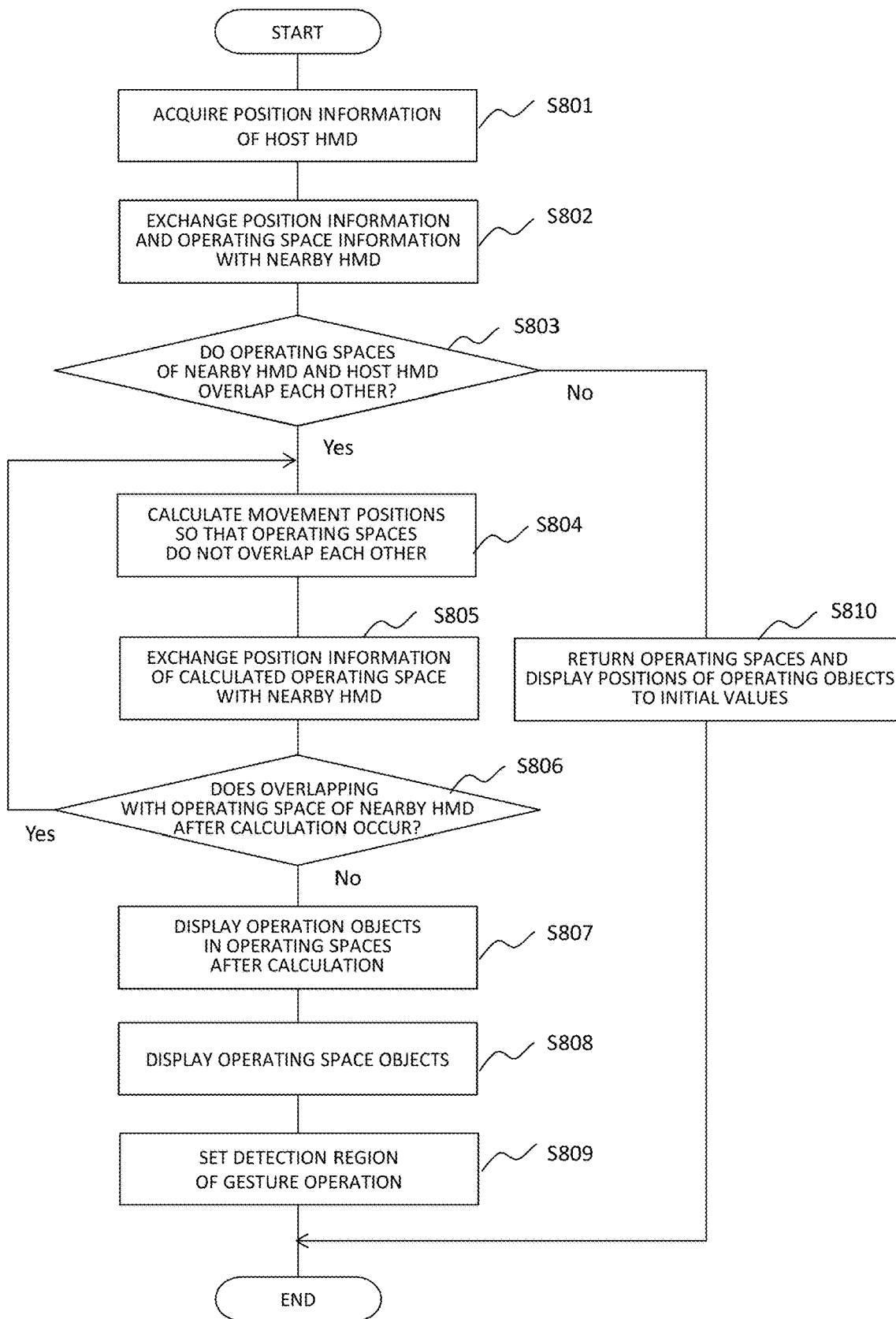
FIG. 12 is a flowchart illustrating a method of adjusting an operating space in a case where two HMD users are close to each other.

FIG. 12 is a flowchart illustrating a method of adjusting the operating spaces in a case where two HMD users are close to each other. Here, description will be given of a case where the display positions of the objects are changed by movement of the gesture spaces as described in FIG. 9. Note that, this flow is repetitively executed by the control unit 205 when the user 3 is using the HMD 1.

S801: The HMD 1 acquires position information (including a direction of the HMD 1) of the host HMD 1 by the position information radio wave reception units 103a and 103b.

S802: The HMD 1 exchanges position information (including a direction) of the HMD, and gesture space information (a position and a size) with a nearby HMD 1' by using short-range inter-terminal communication of the 5th generation mobile communication through the smartphone 2. According to this, position information of the nearby HMD 1' and operating space information are acquired.

S803: A determination is made as to whether or not operating spaces of the nearby HMD 1' and the host HMD 1 overlap each other on the basis of the obtained information of the position and the size of the operating space from the nearby HMD 1'. In a case where the operating spaces do not overlap each other, the process is terminated. In a case where the operating spaces overlap each other, the process proceeds to S804.

S804: Positions at which the operating spaces do not overlap each other are calculated by moving the operating space of the host HMD 1 in a direction to be spaced apart from the operating space of the nearby HMD 1'.

S805: Position information of a calculated operating space is exchanged with the nearby HMD 1' by short-range inter-terminal communication. At this time, operating space position information which is calculated by the nearby HMD 1' is acquired from the nearby HMD 1'.

S806: A determination is made as to whether or not overlapping with the operating space of the host HMD 1 after calculation occurs on the basis of the position information of the operating space after calculation which is acquired from the nearby HMD 1'. In a case where the operating spaces do not overlap each other, the process proceeds to S807. In a case where the operating spaces overlap each other, the process returns to S804, and positions at which the operating spaces do not overlap each other are calculated again. In addition, the process is repeated until the operating spaces do not overlap each other in the determination in S806.

S807: Positions of operation objects for performing a gesture operation with respect to contents are determined and the operation objects are displayed in the operating spaces after calculation.

S808: Objects indicating new gesture spaces are displayed in accordance with a position change of the operating spaces.

S809: New detection regions at the time of detecting a gesture operation by the distance image acquisition unit 106 are set in accordance with the position change of the operating spaces.

S810: Since the operating spaces do not overlap each other between the HMD 1 and the nearby HMD 1', the operating spaces, the display positions of the operation objects, and the detection regions of the gesture operation are returned to initial values.

In the flowchart, description has been given of a case where the gesture spaces are moved to avoid collision, but this is also true of the case of reducing the gesture space. Alternatively, adjustment can also be made in combination of both the cases.

In addition, in the example, it is assumed that two HMD users are close to each other, but this is also true of a case where a plurality of (two or more) HMD users are close to each other.

According to Example 1, in a case where the plurality of HMD users are close to each other, it is possible to avoid collision of bodies of users due to the gesture operation. At this time, it is possible to provide an HMD that reliably detects an HMD that exists nearby and includes an operating space that is easy for a user to use.

Example 2

In Example 2, description will be given of the case of avoiding collision of a user who uses an HMD with a body of a user who does not use the HMD.

Figure 13:
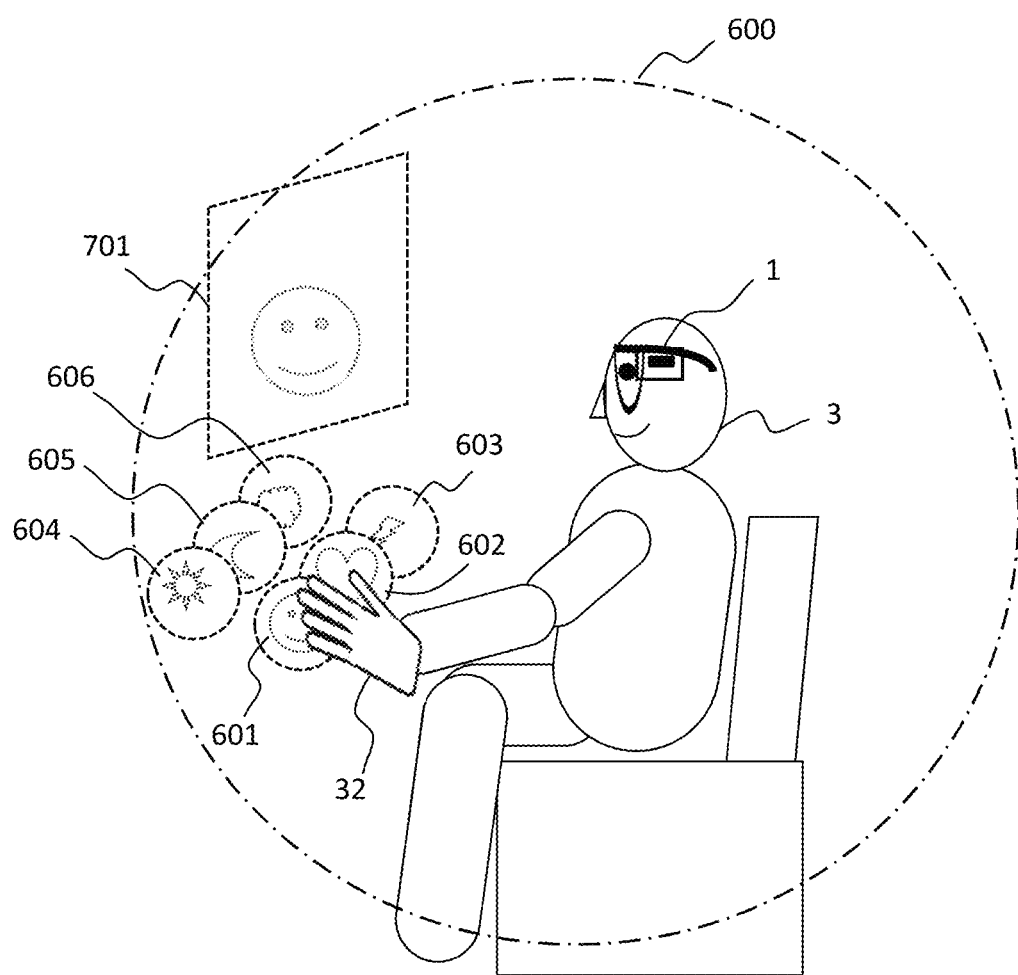
FIG. 13 is a view illustrating a state in which one HMD user uses the HMD (Example 2).

FIG. 13 is a view illustrating a state in which one HMD user uses the HMD. A user 3 is performing a gesture operation for content viewing. In an operating space object 600, operation objects 601 to 603 corresponding to a first group of contents, and operation objects 604 to 606 for a second group of contents are displayed in parallel. For example, a user 3 is in a state in which the user 3 performs a gesture operation with respect to the object 601 with a hand 32, and displays and views a selected content 701. In this state, a case where a person who does not use the HMD has approached the user 3 will be assumed.

Figure 14:
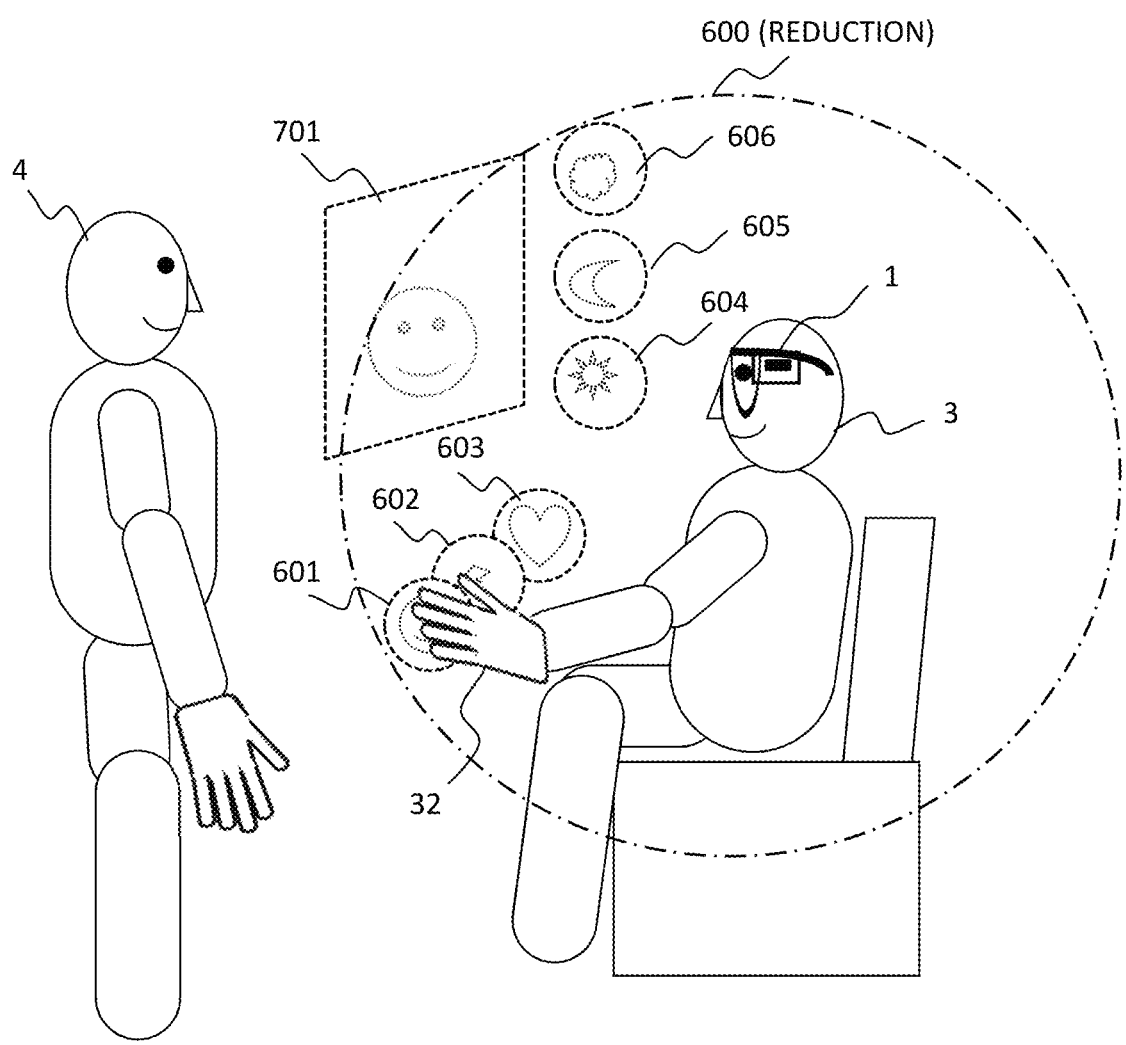
FIG. 14 is a view illustrating a case where a gesture space is reduced to avoid collision.

FIG. 14 is a view illustrating the case of reducing a gesture space to avoid collision. In some cases, another person 4 who does not use the HMD approaches the HMD user 3 from a front side, enters a gesture space (object 600), and approaches display positions of the objects 604 to 606. At this time, when the user 3 performs a gesture operation with respect to the objects 604 to 606, bodies of the user 3 and the other person 4 may collide with each other.

To avoid the collision, the HMD 1 identifies approaching of the other person 4 from information of the distance image acquisition unit 106. In addition, a size of the gesture space (object 600) is reduced to a range in which collision does not occur. In addition, the operation objects 604 to 606 which do not enter the operating space due to the reduction are moved to another position inside the operating space. In this example, the movement is made to a position on a right side of the content 701 that is being viewed. According to this, it is possible to avoid collision of bodies of the user 3 and the other person.

In the above-described example, description has been given of an example in which the gesture space is reduced and the operation objects are moved to avoid collision, but is also possible to cope with the collision by movement of the gesture space or reduction of the operation objects.

As described above, in the case of performing reduction or movement of the operating space, a distance or a direction to the other person 4 is measured by the distance image acquisition unit 106, and a new operating space is determined so that a position of the other person 4 and the operating space do not overlap each other. In addition, it is needless to say that not only a person but also an object is set as a target with which collision is to be avoided.

Figure 15:
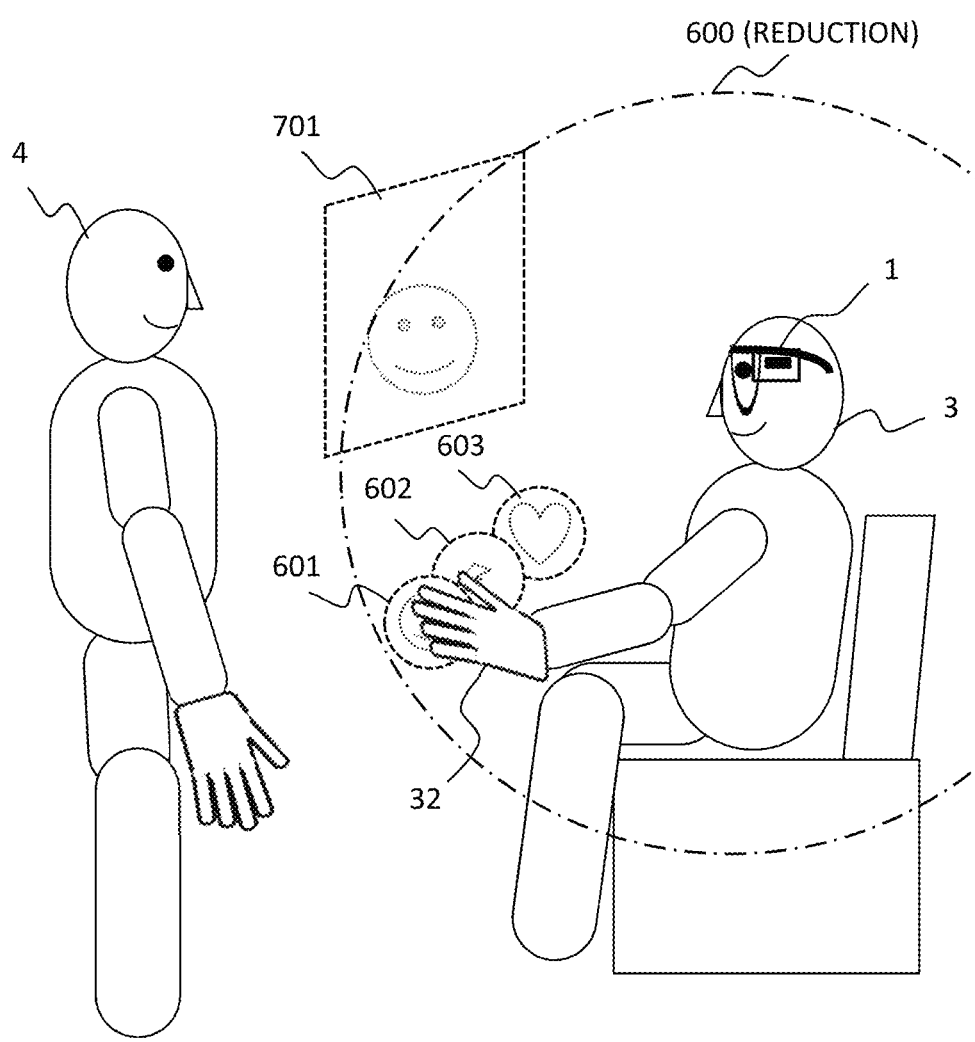
FIG. 15 is a view illustrating a case where a part of an object is set to non-display to avoid collision.

FIG. 15 is a view illustrating a case where a part of an object is set to non-display to avoid collision. When reducing the gesture space (object 600) as illustrated in FIG. 14, an object that does not enter the gesture space may occur. In this case, partial objects (here, 604 to 606) are set to non-display. In addition, an operation corresponding to the objects set to non-display is switched to another operation such as the smartphone 2. In this case, the user 3 is notified of limitation of targets of the gesture operation. According to this, it is possible to avoid collision of bodies of the user 3 and the other person.

Figure 16:
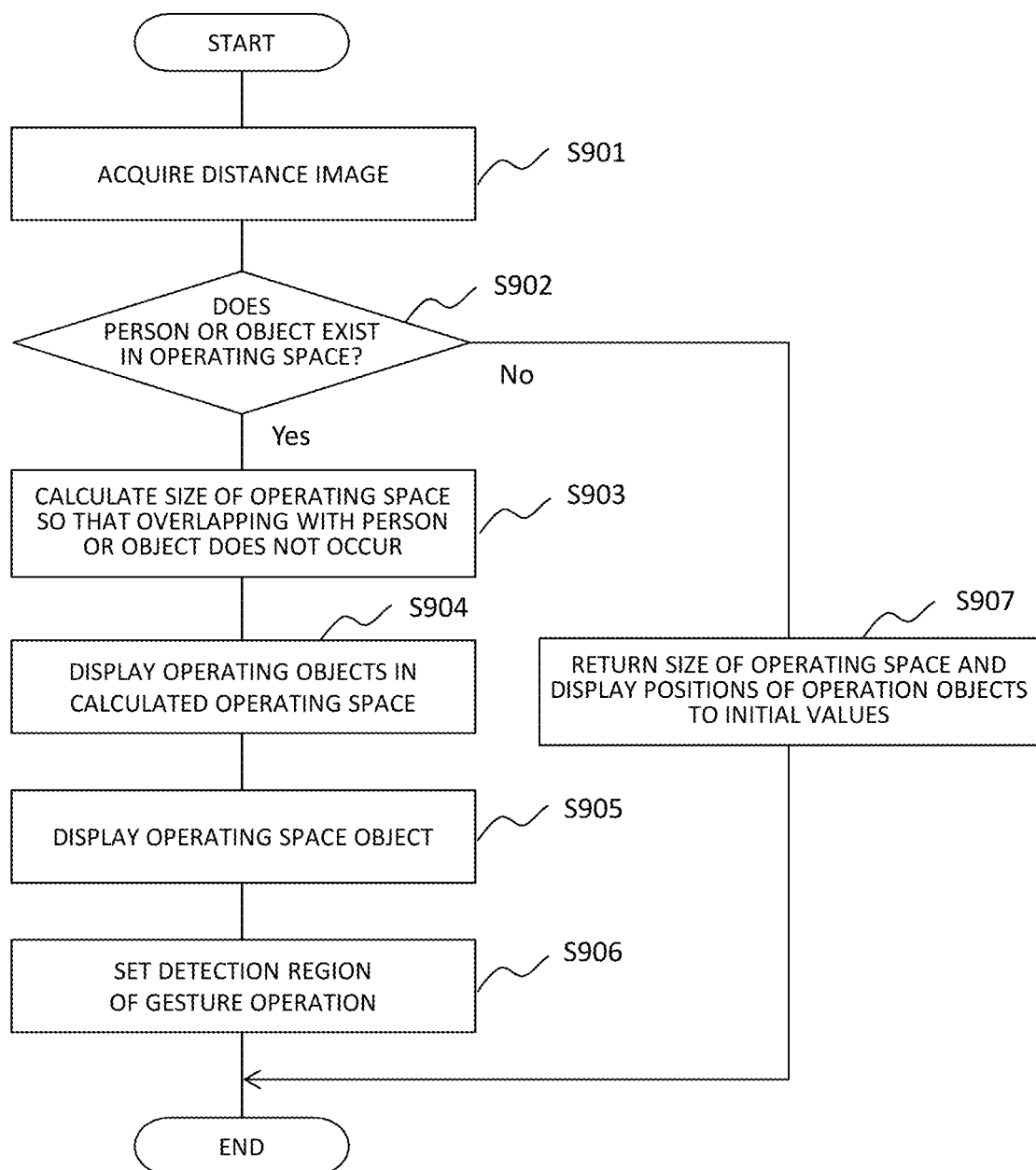
FIG. 16 is a flowchart illustrating a case where a display position of the object is changed through reduction of the operating space.

FIG. 16 is a flowchart illustrating a method of adjusting the operating space in a case where another person who does not use the HMD approaches the HMD user. Here, description will be given of a case where the display positions of the objects are changed through reduction of the gesture space described in FIG. 14. Note that, this flow is repetitively executed by the control unit 205 when the user 3 is using the HMD 1.

S901: The distance image acquisition unit 106 of the HMD 1 acquires a distance image on a front side.

S902: A determination is made as to whether or not a person or an object exists in the gesture space from the distance image that is acquired. In a case where the person or the object does not exist in the operating space, the process proceeds to S907. In a case where the person or the object exists in the operating space, the process proceeds to S903.

S903: A size of the operating space is calculated so that a position at which the person or the object exists and the operating space do not overlap each other. In a calculation method, for example, calculation is performed by reducing a radius of a spherical operating space and by checking whether or not overlapping with the person or the object to occur.

S904: Operation objects for performing a gesture operation are displayed in the operating space that is calculated. Display positions at this time are set to positions as far as possible from the person or the object shown in the distance image. For example, spaces on an upper side, on a lower side, on a left side, and on a right side around a content that is being viewed are remembered as candidates for the display positions, and among the candidates, positions as far as possible from the person or the object shown in the distance image are selected.

S905: An object indicating a new gesture space is displayed in accordance with a size change of the operating space.

S906: A new detection region at the time of detecting the gesture operation by the distance image acquisition unit 106 is set in accordance with the size change of the operating space. Accordingly, adjustment of the operating space is terminated.

S907: Since the person or the object does not exist in the operating space, the size of the operating space, the display positions of the operation objects, and the detection region of the gesture operation are returned to initial values.

In the flowchart, description has been given of a case where the gesture space is reduced to avoid collision, but this is also true of the case of moving the gesture space. Alternatively, adjustment can also be made in combination of both the cases.

Note that, in the example, description has been given of a case where the HMD user is sitting, but an application may be made to use in a case where the user is standing or walking. Particularly, in use while walking, even in a case where another person is not in the gesture space, it may be expected that the other person enters the operating space when the walking continues. At that time, a warning may be issued to a user by a method such as displaying of a warning object or outputting of a warning sound. In addition, in the case of outputting the warning sound, an identification may be made as to whether or not an approaching person is an adult or a child from the distance image obtained by the distance image acquisition unit, and a priority may be given to a time when issuing a warning in the case of the child, for example, the warning may be issued early.

According to Example 2, it is possible to provide an HMD including an operating space that is capable of avoiding collision of bodies between a user who uses the HMD and a nearby person who does not use the HMD due to a gesture operation, and is easy for the user to use.

REFERENCE SIGNS LIST 1, 1' Head-mounted display (HMD)
2, 2' Smartphone
3, 3' User
4 Another person
5a, 5b Beacon for position information acquisition
20 Communication cable
32, 32', 33, 33' User's hand
101a, 101b System storage unit
102a, 102b Camera
103a, 103b Position information radio wave reception unit (position information acquisition unit)
104a, 104b Image projection unit
105a, 105b See-through lens
106 Distance image acquisition unit
201 Memory
202 Storage
203 Bus
204 Input unit
205 Control unit
206 Smartphone communication unit
300 to 303 Mixed reality object 600, 600' Operating space object
601 to 606 Operation object
611 Object of smartphone
612 Object of user's hand
701 Mixed reality content

The invention claimed is:

1. A head-mounted display comprising:
a projector configured to project an image;
a see-through lens configured to superimpose the image projected by the projector on a nearby space and display the image as a mixed reality object;
a receiver configured to receive position information of the head-mounted display;
a communication interface; and
a controller,
wherein the controller is configured to:
set a first operating space in which a gesture operation of a user of the head-mounted display may be performed,
control the projector to display an image of the first operating space and an image of an operation object as the mixed reality object via the see-through lens, the operation object is an object operated by the gesture operation of the user of the head-mounted display and is displayed in the first operating space,
acquire information of a position and a second operating space of another apparatus by the communication interface, the second operating space is a space in which a gesture operation of a user of the another apparatus may be performed,
determine whether the first operating space overlaps with the second operating space based on the position information of the head-mounted display received by the receiver and the information of the position and the second operating space of the another apparatus acquired by the communication interface,
reduce a size of the first operating space so as not to overlap the second operating space if the first operating space overlaps with the second operating space, and
control the projector so that a part of the operating object is set to non-display if an image of the reduced size first operating space is displayed as the mixed reality object via the see-through lens, and
control the communication interface so as to communicate with a smartphone and switch an operation corresponding to the non-displayed object from the gesture operation to an operation by the smartphone if the part of the operating object is set to non-display.

2. The head-mounted display according to claim 1, wherein the controller is configured to notify the user of the head-mounted display that a part of the gesture operation is limited if the part of the operating object is set to non-display.

3. The head-mounted display according to claim 1, wherein the operation object is for performing an operation of selection, viewing initiation, or viewing termination of a content.

4. The head-mounted display according to claim 1, further comprising a camera configured to detect the gesture operation of the user of the head-mounted display.

5. A display apparatus comprising:
a projector configured to project an image;
a display configured to superimpose the image projected by the projector on a nearby space and display the image as a mixed reality object;
a receiver configured to receive position information of the display apparatus;
a communication interface; and
a controller,
wherein the controller is configured to:
set a first operating space in which a gesture operation of a user of the display apparatus may be performed,
control the projector to display an image of the first operating space and an image of an operation object as the mixed reality object via the display, the operation object is an object operated by the gesture operation of the user of the display apparatus and is displayed in the first operating space,
acquire information of a position and a second operating space of another apparatus by the communication interface, the second operating space is a space in which a gesture operation of a user of the another apparatus may be performed,
determine whether the first operating space overlaps with the second operating space based on the position information of the display apparatus received by the receiver and the information of the position and the second operating space of the another apparatus acquired by the communication interface,
reduce a size of the first operating space so as not to overlap the second operating space if the first operating space overlaps with the second operating space,
control the projector so that a part of the operating object is set to non-display if an image of the reduced size first operating space is displayed as the mixed reality object via the display, and
control the communication interface so as to communicate with a smartphone and switch an operation corresponding to the non-displayed object from the gesture operation to an operation by the smartphone if the part of the operating object is set to non-display.

6. The display apparatus according to claim 5, wherein the controller is configured to notify the user of the display apparatus that a part of the gesture operation is limited if the part of the operating object is set to non-display.

7. The display apparatus according to claim 5, wherein the operation object is for performing an operation of selection, viewing initiation, or viewing termination of a content.

8. The display apparatus according to claim 5, further comprising a camera configured to detect the gesture operation of the user of the display apparatus.

* * * * *